United States Patent
Jensen et al.

(10) Patent No.: US 9,906,372 B2
(45) Date of Patent: Feb. 27, 2018

(54) AUTHENTICATION DEVICES, KEY GENERATOR DEVICES, METHODS FOR CONTROLLING AN AUTHENTICATION DEVICE, AND METHODS FOR CONTROLLING A KEY GENERATOR

(71) Applicant: Intel Mobile Communications GmbH, Neubiberg (DE)

(72) Inventors: Thomas Rosted Jensen, Aalborg SV (DK); Bo Bjerrum, Nibe (DK)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 52 days.

(21) Appl. No.: 13/908,015

(22) Filed: Jun. 3, 2013

(65) Prior Publication Data

US 2014/0359288 A1 Dec. 4, 2014

(51) Int. Cl.
| | |
|---|---|
| *H04L 9/32* | (2006.01) |
| *H04W 12/04* | (2009.01) |
| *H04W 12/06* | (2009.01) |
| *H04L 9/08* | (2006.01) |

(Continued)

(52) U.S. Cl.
CPC .......... *H04L 9/3268* (2013.01); *H04W 12/04* (2013.01); *H04W 12/06* (2013.01); *H04L 9/0822* (2013.01); *H04L 9/0866* (2013.01); *H04L 9/0869* (2013.01); *H04L 63/0823* (2013.01); *H04W 12/10* (2013.01)

(58) Field of Classification Search
CPC ... H04L 9/00; H04L 9/08; H04L 9/083; H04L 9/0838; H04L 9/0861; H04L 9/0866; H04L 9/0869; H04L 9/0894; H04L 9/0897; H04L 9/30; H04L 9/3013; H04L 9/32; H04L 9/3247; H04L 9/3268; H04L 63/00; H04L 63/0442; H04L 63/06; H04L 63/061; H04L 63/062; H04L 63/08; H04L 63/0876; H04W 12/00; H04W 12/04; H04W 12/06; H04W 12/08

See application file for complete search history.

(56) References Cited

U.S. PATENT DOCUMENTS

| | | | |
|---|---|---|---|
| 6,151,676 A * | 11/2000 | Cuccia et al. | 713/176 |
| 2004/0008846 A1 | 1/2004 | Medvinsky | |
| 2004/0054907 A1 | 3/2004 | Chateau et al. | |

(Continued)

FOREIGN PATENT DOCUMENTS

WO     20140042701 A1     3/2014

OTHER PUBLICATIONS

International Search Report based on PCT/EP2014/061452 (7 pages) dated Dec. 11, 2014.

*Primary Examiner* — Robert Leung
*Assistant Examiner* — Adrian Stoica
(74) *Attorney, Agent, or Firm* — Viering, Jentschura & Partner mbB

(57) ABSTRACT

An authentication device may be provided. The authentication device may include a memory configured to store: a first public key; and first data signed using a first private key corresponding to the first public key, the signed data including a second public key. The authentication device may further include a first verification circuit configured to verify the first data using the first public key; and a second verification circuit configured to verify second data using the second public key, the second data signed using a second private key corresponding to the second public key.

16 Claims, 8 Drawing Sheets

(51) Int. Cl.
*H04L 29/06* (2006.01)
*H04W 12/10* (2009.01)

(56) References Cited

U.S. PATENT DOCUMENTS

2006/0129484 A1 6/2006 Paksoy et al.
2010/0169660 A1 7/2010 Voss et al.
2010/0257360 A1 10/2010 Bae et al.

* cited by examiner

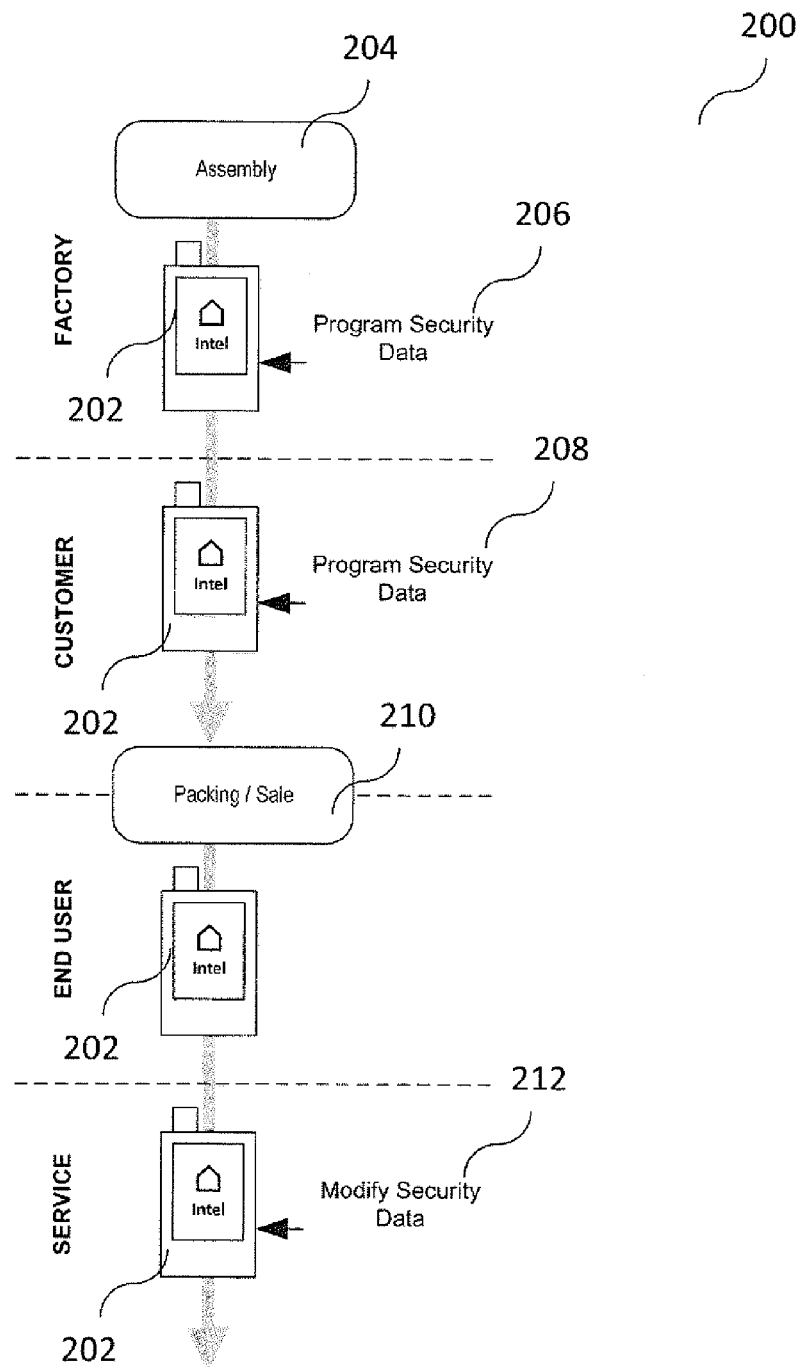

AUTHENTICATION DEVICES, KEY GENERATOR DEVICES, METHODS FOR CONTROLLING AN AUTHENTICATION DEVICE, AND METHODS FOR CONTROLLING A KEY GENERATOR

TECHNICAL FIELD

Aspects of this disclosure relate generally to authentication devices, key generator devices, methods for controlling an authentication device, and methods for controlling a key generator device.

BACKGROUND

When producing a technical device it may be a challenge for manufacturers to protect the software and data within the device, to prevent tampering or modification. Tampering or modification of device software or data may for example be done by the consumer, with the purpose of removing restrictions or changing behavior of the device. These unauthorized changes may be in conflict with the manufacturer's (or sellers') business model or the intended purpose of the device. Thus, devices and methods may be desired to protect the software and data within the device, to prevent tampering or modification.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 2 shows a diagram illustrating multiple levels of programming and modifying security data for a device;

DESCRIPTION OF EMBODIMENTS

Figure 1:
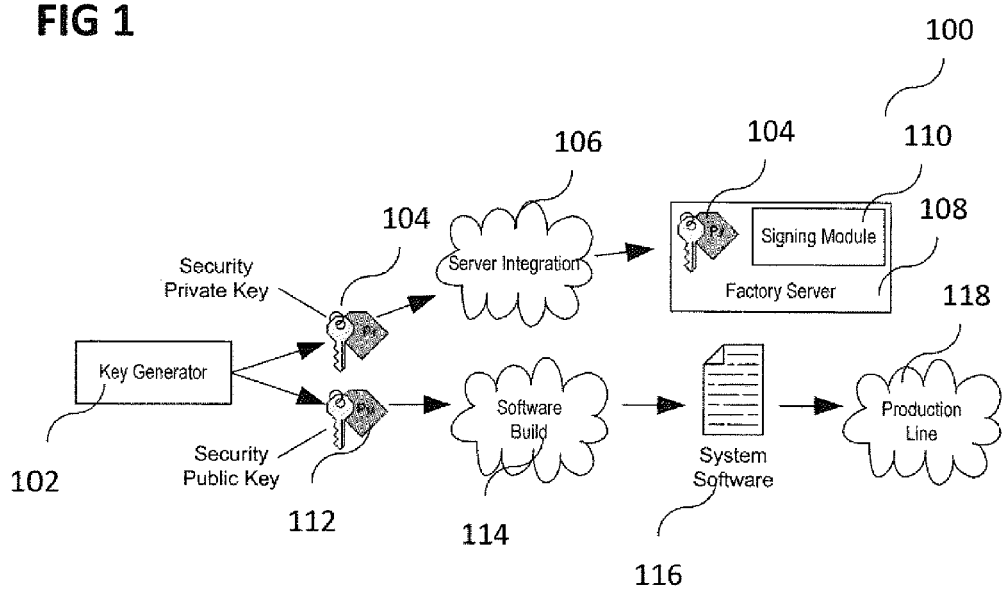
FIG. 1 shows an illustration of a 1st level manufacturer preparation.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

An authentication device may for example be a radio communication device. A radio communication device may for example be an end-user mobile device (MD). A radio communication device may be any kind of radio communication terminal, mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS).

A radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard.

The authentication device may include a memory which may for example be used in the processing carried out by the authentication device. The key generator device may include a memory which may for example be used in the processing carried out by the key generator device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Devices and methods may be provided for multilevel customization.

Devices and methods may be provided which may combine several goals.

Devices and methods may be provided for device software and data protection: A manufacturer may be able to program software and data into an electronic device and be assured that it is protected and cannot be changed or tampered with.

Devices and methods may be provided for multilevel data and software customization: A manufacturer may produce a batch of devices, and program some software and data into it. Then he may sell this batch of devices to a 2nd level manufacturer, who again may program further software and data into the device without utilizing or exposing any secrets from the 1st level manufacturing.

Devices and methods may be provided which provide a solution used to solve both points described above, so that both 1st level manufacturer and 2nd level manufacturer may be able to program software and data and be assured that it cannot be tampered with.

In the following, devices for software and data protection will be described.

When producing a technical device, it may be a challenge for manufacturers to protect the software and data within the device, to prevent tampering or modification. Tampering or modification of device software or data may for example be done by the consumer, with the purpose of removing restrictions or changing behavior of the device. These unauthorized changes may be in conflict with the manufacturer's (or sellers') business model or the intended purpose of the device.

Some examples of data that should not be modified may be:

Language packs: The language packs may include the languages used in a specific geographical region. The price of the device may be different from one region to another, so it may be important that consumers from cannot just buy the low cost version from a low cost region and then change the language pack to match his home region;

SIM (subscriber identity module) locks: SIM locks (which may also be referred to as simlocks) may be used in mobile devices. The simlock data may restrict which network operators a device can be used with. The idea may be that the device is sold by a network operator at a low prize, because the operator may be ensured that the device will only work in his network for a predefined subscription period. The user may be interested in removing the SIM lock restriction, to be able to use the device with any operator; and Calibration: An electronics device may include calibration data that may ensure that its operation is within the allowed limits. Modifying calibration data may cause the device to operate in a harmful way, so that it may be disturbing other equipment or causing damages.

In the following, multilevel data and software customization will be described.

Multilevel customization may mean that a manufacturer is producing a batch of devices and the manufacturer may initially store some customization data or software into the devices. Next, this batch of devices may be sold to a 2nd level manufacturer, who may desire to be able to program some further customization data or software into the devices. This may imply some challenges.

For example, it may be desired to prevent sharing of secrets. The 1st level manufacturer may have used "factory secrets" to program software and customization data in a secure way that will prevent tampering. However the 1st level manufacturer may not want to share these "factory secrets" with the 2nd level manufacturer, as this may increase the risk of the secret being leaked.

FIG. 1 shows an illustration 100 of a 1st level manufacturer preparation. In the concept shown in FIG. 1, the factory uses asymmetric encryption to ensure that data cannot be modified (which may be understood as authentication). Prior to producing the devices, a private/public key pair is generated. In other words: the security key pair (which may include a private key and a public key) may be generated at pre-production. For example, a key generator 102 may generate a private key 104 (which may also be referred to as security private key) and a public key 112 (which may also be referred to as a security public key). The private key 104 may be stored in a secret factory server 108, which may further include a signing module 110. The process of storing the private key 104 in the factory server 108 may be referred to as server integration, like indicated by block 106 in FIG. 1. The public key 112 may be a part of the system software (for example system software 116) to be stored in the electronic device and to be used in the production line 118. The process of including the public key 112 to the system software 116 may be referred to as software build, like indicated by block 114 in FIG. 1.

The above described general concept may have the following assumptions:

Integrity and Authenticity is assured for system software: It is assumed that initial measures are used to ensure that the software image installed by 1st level manufacturer cannot be tampered or modified. In case of tampering, the devices will enforce countermeasures that prevent usage of the tampered data or software.

Integrity and Authenticity is assured for the "Public Key": A "public key" installed is used as a mechanism to validate other data. The integrity and authenticity may be assumed to be guaranteed by a manufacturer chosen solution.

Cloning Prevention: The device must be able to deliver some device unique data, which cannot be tampered. The unique data is used to prevent cloning of software or data, which is programmed specifically for the individual device.

The concept may use the private/public key the following way:

Private Key: The "private key" is used to sign data. The data which has a "signature" attached can be validated with the "public key". The private key is a "secret element" in the 1st manufacturer production.

Public Key: The "public key" is used for validating data/software, which has been signed with the private key.

The private/public key pair could in principle be unique for each device; however this concept may describe the 1st level manufacturer key pair as being common for a large batch of produced devices. In other words: The same key pair may be used for a large batch of mobile phones. It is used by the factory to sign security related data. Since same key is used for many devices, protecting the private key is of high importance.

During production, programming of security data may be desired in multiple levels.

FIG. 2 shows a diagram 200 illustrating multiple levels of programming and modifying security data for a device 202, for example an authentication device, for example a mobile device, for example a mobile radio communication device, for example a mobile phone.

During assembly 204, a factory may program a first set of security data (for example an IMEI (International Mobile Station Equipment Identity)), like indicated by arrow 206, and may pass the device 202 on to a customer. It will be understood that a customer may be a customer of the factory, for example a mobile radio communication service provider.

The customer may program a second set of security data (for example a SIM lock) for the device 202, like indicated by arrow 208, and may pass the device 202 on to packing and sale 210.

After packing and sale, the device 202 may arrive at and end user, for example an individual person who bought the device 202 from the customer.

The end user may have bought the device 202 and may not change the security data, but some day service may be needed.

The service may modify or reprogram some security data, like indicated by arrow 212.

In the following, customization at a 1st level manufacturer will be described.

Figure 3:
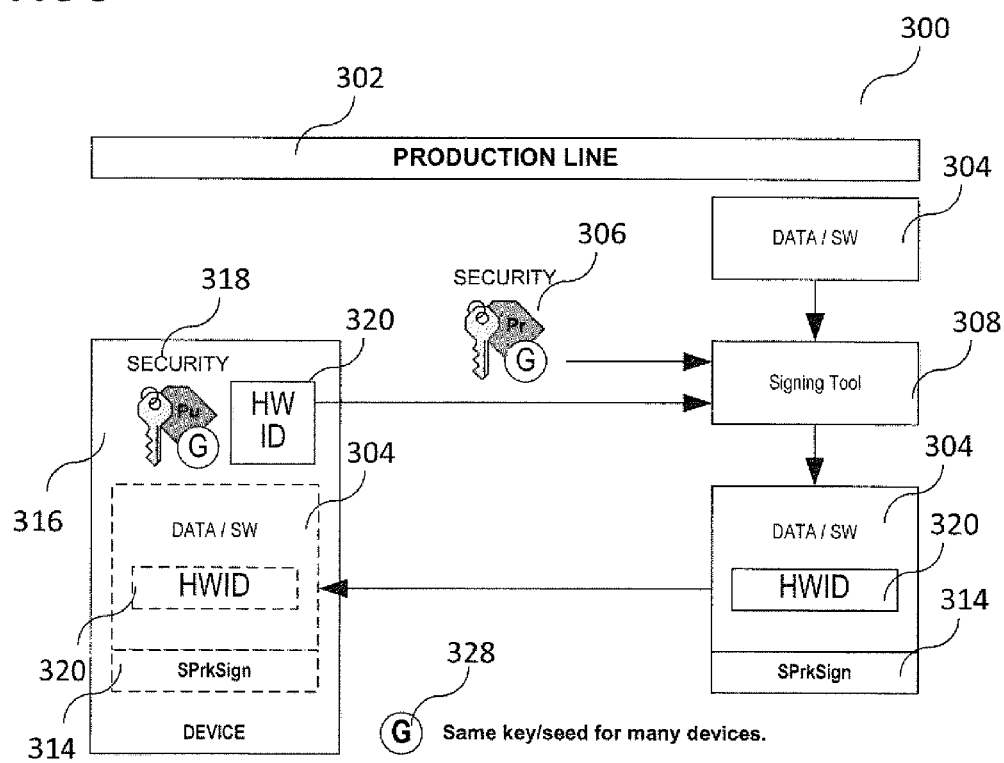
FIG. 3 shows a system for programming device specific data and/or software for a device at a production line.

FIG. 3 shows a system 300 for programming device specific data and/or software for a device 316 at a production line 302.

At the 1st level manufacturer, a basic software part (not shown) and a security public key 318 may have been installed in the device 316. It is assumed that existing counter measurements are in place to ensure tamper resistance of this public key 318 and basic software.

Additional (device specific) data or software may be signed with the global "Security Private Key" 306. The device 316 may be able to verify this data using the global "Security Public Key" 318. FIG. 3 shows programming of extra (in other words: additional) device specific data and/or software.

First, a device unique serial number (HWID) 320 is read out from the device 316. This data may be embedded with device specific data/software 304 in order to prevent cloning from one device to another. A signing tool 308 may generate a signature 314 ensure that the HWID 320 is used in the signing process, which may enable the device to validate both signature 314 and the HWID link 320. As indicated by a "G" in a circle 328, the same key or key seed (which may be understood as a secret based on which a pair of a public key and a private key is generated) is used for many devices.

Ideally, just use one private key signing all security data is used, but:

The factory has a responsibility for protecting their "private key" and they will not deliver it to any customer;

The customer wants to use their own "private key" for signing and will not accept using a network-based factory private key interface;

The service may experience issues, as the customer may not risk exposing their private key to the service centers, so that a better option is that each service center uses their own key.

Devices and methods may overcome the above described issues using a device Specific Key and key swap certificates, like will be described in more detail below, for example by a 1st level manufacturer which provides a program key swap certificate.

Figure 4:
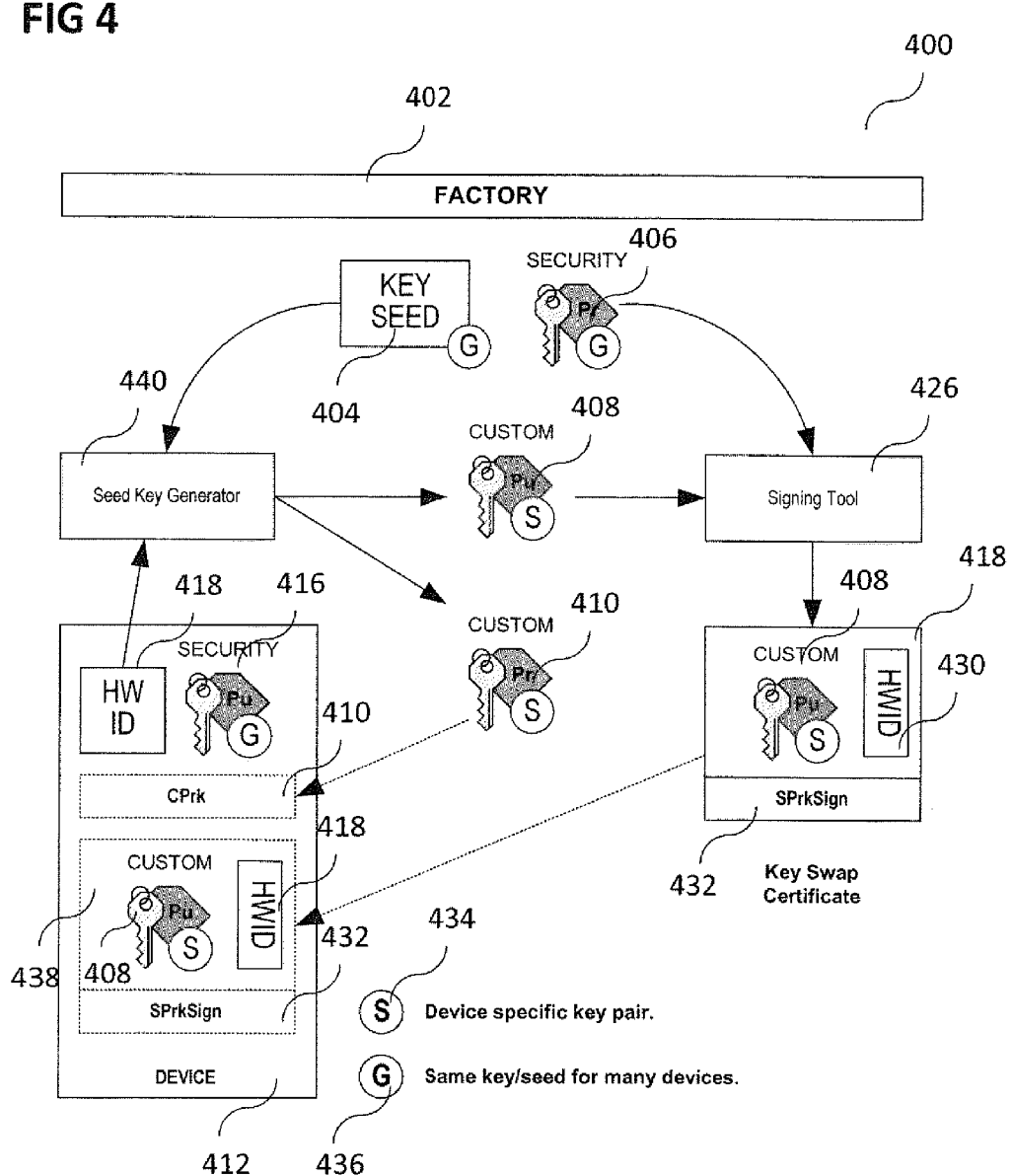
FIG. 4 shows a system for generating a key swap certificate at a factory.

FIG. 4 shows a system 400 for generating a key swap certificate at a factory 402. A key swap certificate 438 may be introduced, like described in more detail below. This may allow a 2nd level manufacturer to program additional data or software into a device 412 (for example an authentication device). In FIG. 4, keys denoted by an encircled "S" 434 may be keys of a device specific key pair. Keys denoted by an encircled "G" 436 may be keys where the same key or (key) seed for generating the key may be used for more than one device (for example for many devices). A key pair including a private key (which may be referred to as a security private key SPrk 406) and a public key (which may be referred to as a security public key 416) may be used for a plurality of devices. The security private key 406 may be a secret of the factory, and may never leave the factory. The security public key 416 may be stored in the device 412 and may be protected using a commonly known protection scheme.

The key swap certificate may be a main component in the multilevel customization according to various devices and methods. The following steps describe the key swap generation in more detail.

A seed key generator 440 may be provided to allow generation of the same key pair based on same input. This may be beneficial, as a manufacturer would otherwise have to keep track of all randomly generated key pairs in case subsequent reprogramming is required. Keeping large databases with device specific data is not desirable.

A key seed 404 may be the secret used for the key generation. Together with the HWID (hardware identification) 418 read from the device 412 (for example a radio communication device, for example a mobile phone), it may be possible to generate the same key pair for the same device, but again assuring a low likelihood of two devices having the same key pair. In other words, a device specific key pair (including a public key, for example a custom public key CPuk 408, and a private key, for example a custom private key CPrk 410), may be determined based on the key seed 404 and the HWID 418. A private/public key generator may use random data for generating key pairs. In the "Seed Key Generator", instead of using "true random data", an infinite supply of "pseudo random data" may be provided based on the seed. Pseudo random data may mean that the exact same sequence of "random data" will be regenerated every time the method is restarted. Hence the "known key generator" method may always end up re-generating same key pair, since the seed based "pseudo random data" supplied will always be the same.

A signing tool 426 may generate the key swap certificate 438. The signing tool 426 may generate the key swap certificate 438 by signing the custom public key 408 and the HWID 418 (which the signing tool 426 may read from the device 412) with the security private key 406. The signature may be denoted by SPrkSign 432. In other words: The CPuk 408 may be placed in the key swap certificate 438, which may be signed with the SPrk 406.

The key swap certificate 438 may be programmed into the device. At runtime, the device 412 may validate the certificate 438 by validating the signature 432 using the security public key 416, and also ensuring that the HWID from the certificate 438 matches the device HWID 418 stored in the device 412.

The custom private key 410 may be used by a 2nd level manufacturer to program additional software and/or data which may be validated using the custom public key 408 from the key swap certificate 438. The private key handling may be done in two ways like described in the following:

A) The 1st level manufacturer may store the custom private key 410 temporarily in the device 412. This may allow the 2nd level manufacturer to read the key 410 out and use it for signing. Once read, the private key 410 may be deleted from the device 412. Storing this private key 412 temporarily in the device 410 is only a limited risk, since revealing one private key 410 specific to one device 412, will not break security of other devices, as it would be the case if the global security private key 406 is revealed.

B): The 2nd level manufacturer ordering a batch of devices may provide the key seed 404 (which may in this case be referred to as a customer key seed) to be used for key swap certificate generation. The 1st level manufacturer can then simply discard the custom private key 408 since the 2nd level manufacturer may be able to regenerate the key pair themselves based on the customer key seed 404.

For key pair recovery (or key pair regeneration), the seed key generator 440 may ensure that it outputs the same key pair based on the same input (for example based on the same key seed 404 and the same HWID 418).

Figure 5:
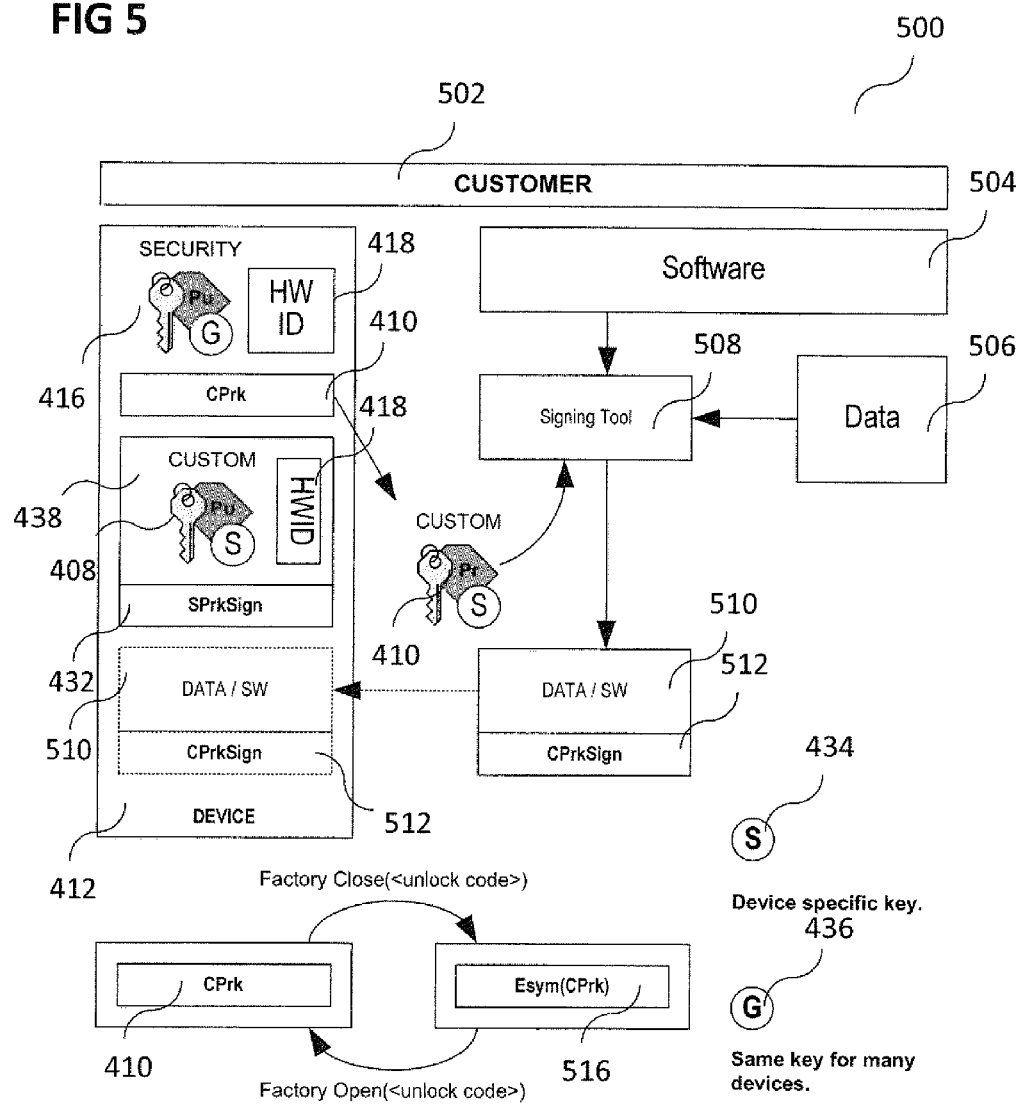
FIG. 5 shows a system for programming data and/or software at a customer.

FIG. 5 shows a system 500 for programming data and/or software at a customer 502, for example a 2nd level manufacturer. Various parts of the device 412 shown in FIG. 5 are similar or identical to the device 412 shown in FIG. 4, so that the same reference signs may be used and duplicate description may be omitted.

The 2nd level manufacturer may first desire to fetch the custom private key 410. He can get the key in two ways: He may read the custom private key 410 from the device, or he may generate the custom private key 410 using the secret key seed.

For example, in the system 500, the custom private key is read from the device 412.

The custom private key 410 may be stored in device 412. It may be read out and used for signing operations. When the 2nd level manufacturer is done using the key, he may choose to:

A) Wipe the key 410 completely from the device 412. In case further signing is needed, this can now only be accomplished if the private key 412 is regenerated using the secret key seed.

B) Encrypt the private key 410 symmetrically using an unlock code. The device could then generate a symmetric key from the unlock code and provide interfaces to encrypt or decrypt the private key. This may enable the 2nd level manufacturer to recover the private key 418, without the need of a database with all keys. For example, the 2nd level manufacturer may use any unlock code, for example being unique for each devices. This unlock code may optionally be derived from a secret plus IMEI or HWID from devices. It may be up to the 2nd level manufacturer how they prefer to construct the unlock code. The devices and methods provided do not put any restriction here, and allow full flexibility on handling the unlock code. In FIG. 5, encryption of the non-encrypted custom private key 410 and decryption of the encrypted custom private key 516 are illustrated using arrows between the non-encrypted custom private key 410 and the encrypted custom private key 516.

In other words: After using the device specific custom private key 410, protecting for the device specific "CPrk" 410 may be provided using functions "Factory Open/Close", which may encrypt or decrypt the private key 410 (or the encrypted private key 516) based on <unlock code> given as input. The customer may choose to generate an unlock code based on IMEI transformation and a secret seed.

In the customer production line, the customer may read out "CPrk" 410 and HW ID 418 from device 412. A production tool may generate desired programming data 506 and software 504. A signing tool 508 may sign the data and software using the custom private key 410. The software (SW) and data may be combined as data/SW 510 and the signature 512 using the custom private key 410 may protect authenticity of the data/SW 510. The data/SW 510 and the signature 512 may get programmed into the device 412 (for example an authentication device, for example the mobile phone).

In another example, instead of storing and reading the custom private key 410 from the device 412, the custom private key 410 may be determined by the customer using the secret key seed: The custom private key 410 may be recovered by re-generating the custom key pair from the key seed (for example the key seed 404 of FIG. 4) and the HWID 418. Thus, the custom private key 410 may never need to be stored in the device 412.

For validation in the device 412 (for example the mobile phone), the device 412 may use the security public key (SPuk) 416 to validate the custom public key (Cpuk) 408 in the key swap certificate 438 stored in the device 412. Next, the device 412 may use the custom public key (CPuk) 408 to validate the programmed security data 510, which is signed with the custom private key (CPrk) 410 (and the resulting signature CPrkSign 512).

Devices and methods using the device specific key pair may provide that there is no need for a global server. There may be no need to protect the (custom) private key (CPrk) 410 on a server, since a leaked key from one phone can't be used for compromising other phones.

Devices and methods using the device specific key pair may provide that the production tool may be embedded into phone, for example into the phone software. This may reduce complexity, since customer will not be concerned with how to generate tickets, and signing of IMEI and simlock data. A signing module may be simplified, as it only needs to handle signing of key swap certificates 438.

Devices and methods using the device specific key pair may provide that supporting customers may be simple or with no security demands: By omitting signing of the CPuk key, the signing server (or signing tool) may not be needed. The device (for example the phone) may apply some low security measures to protect the device specific key pair.

Figure 6:
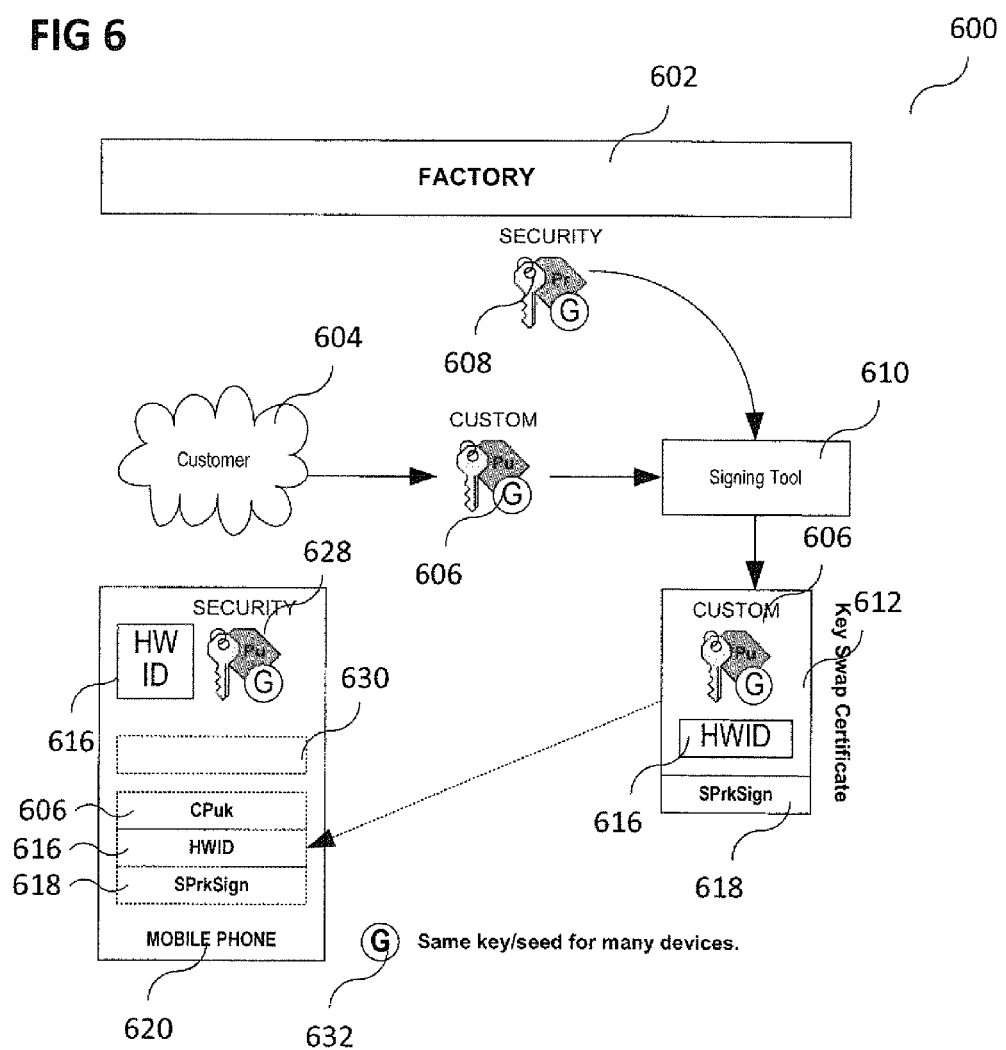
FIG. 6 shows a system illustrating another example of generating a key swap certificate for multilevel customization.

FIG. 6 shows a system 600 illustrating another example of generating a key swap certificate for multilevel customization. A factory 602 may sign all security data with a security private key 608 (SPrk) using a signing tool 610. A customer 604 may deliver a "Custom Public Key" 606 (CPuk). The factory 602 may then generate a "Key Swap Certificate" 612. The key swap certificate 612 may include the custom public key 606 and a HWID (hardware identifier) 616 of an authentication device, for example a mobile device 616. The key swap certificate 612 may be signed using a security private key, and the signature 618 may be included to the key swap certificate 612. The key swap certificate may be stored on the mobile device 620. The mobile device (for example mobile or mobile phone) 620 may validate the key swap certificate 612 using a security public key 628 (SPuk). Like indicated by an empty field 630, there is no need to store the CPrk on the mobile device 620, because there is only one private key for all devices.

The customer data generation may be as follows: The customer 604 may generate and program their security data using the "Custom Private Key".

In FIG. 6, keys denoted by an encircled "G" 632 may be keys where the same key or seed for generating the key may be used for more than one device (for example for many devices).

Validation in the mobile phone 620 may be as follows: The mobile 620 may use SPuk 628 to validate CPuk 606 in the "Key Swap Certificate" 618 (stored on the mobile 620). Next it may use CPuk 606 to validate customer programmed security data.

It will be understood that a public key and a private key may correspond to each other. For example, a security public key (which may be an example for a first public key) may correspond to a security private key (which may be an example for a first private key). For example, a customer public key (which may be an example for a second public key) may correspond to a customer private key (which may be an example for a second private key). It will be understand that a public key and a corresponding private key may provide a key pair. For example, a private key may be used to sign data (in other words: may be used to provide a signature for the data), and a corresponding public key may be used to authenticate the data (in other words: to authenticate the signature of the data).

Figure 7:
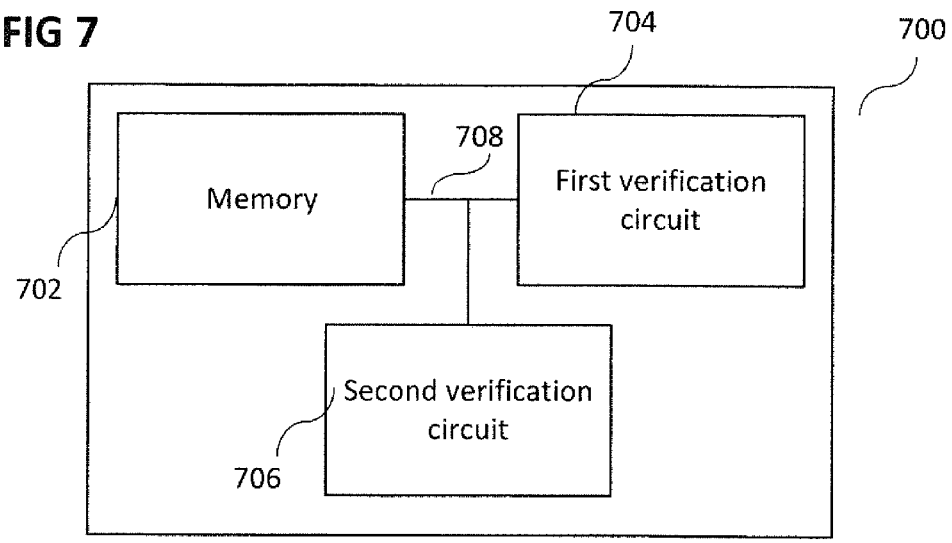
FIG. 7 shows an authentication device with a memory, a first verification circuit, and a second verification circuit.

FIG. 7 shows an authentication device 700. The authentication device 700 may include a memory 702. The memory 702 may store a first public key. The memory 702 may further store first data signed using a first private key corresponding to the first public key, the signed (first) data including a second public key. The authentication device 700 may further include a first verification circuit 704 configured to verify the first data using the first public key. The authentication device 700 may further include a second verification circuit 706 configured to verify second data using the second public key, the second data signed using a second private key corresponding to the second public key. The memory 702, the first verification circuit 704, and the second verification circuit 706 may be coupled with each other, for example via a connection 708, for example an optical connection or an electrical connection, such as for example a cable or a computer bus or via any other suitable electrical connection to exchange electrical signals.

The memory 702 may further store the second data. The second data may include or may be configuration information for the authentication device 700.

The configuration information may include or may be data of at least one of the following type: language data, the language data including or being localization information for the authentication device 700; simlock data, the simlock data including or being information about a simlock of the authentication device 700; and calibration data for the authentication device 700.

The memory 702 may include a protected portion (not shown). The protected portion may store the first public key.

The memory 702 may further store the second private key.

Figure 8:
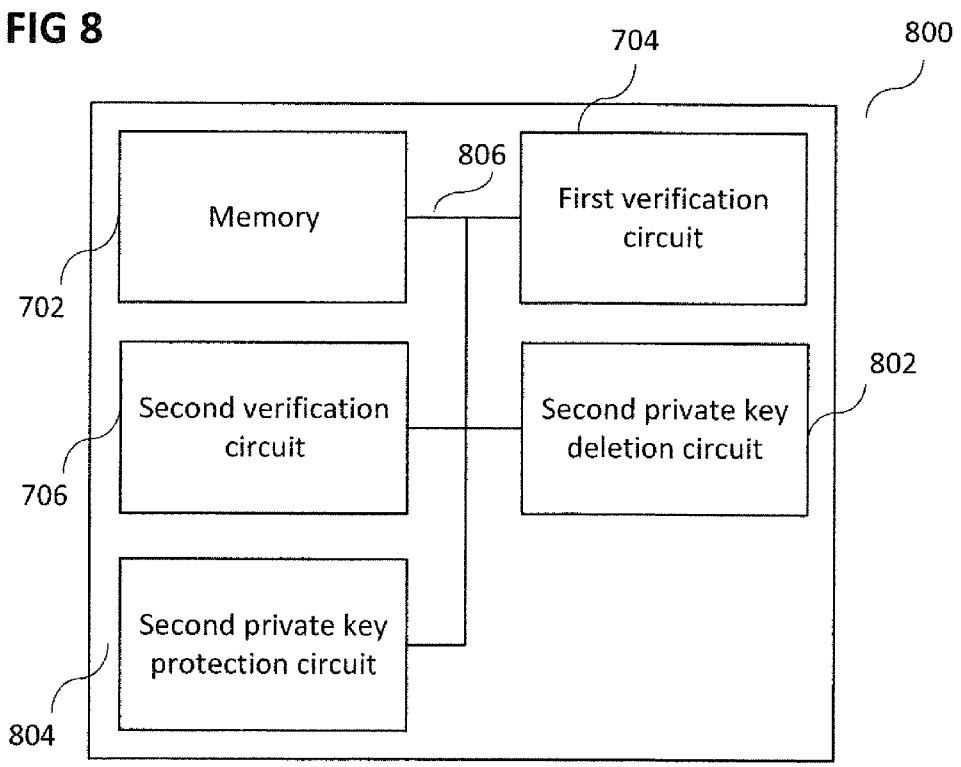
FIG. 8 shows an authentication device with a memory, a first verification circuit, a second verification circuit, a second private key deletion circuit, and a second private key protection circuit.

FIG. 8 shows an authentication device 800. The authentication device 800 may, similar to the authentication device 700 of FIG. 7, include a memory 702. The authentication device 800 may, similar to the authentication device 700 of FIG. 7, include a first verification circuit 704. The authentication device 800 may, similar to the authentication device 700 of FIG. 7, include a second verification circuit 706. The authentication device 800 may further include a second private key deletion circuit 802, like will be described below. The authentication device 800 may further include a second private key protection circuit 804, like will be described below. The memory 702, the first verification circuit 704, the second verification circuit 706, the second private key deletion circuit 802, and the second private key protection circuit 804 may be coupled with each other, for example via a connection 806, for example an optical connection or an electrical connection, such as for example a cable or a computer bus or via any other suitable electrical connection to exchange electrical signals.

The second private key deletion circuit 802 may delete the second private key from the memory.

The second private key deletion circuit 802 may delete the second private key from the memory based on a pre-determined condition.

The pre-determined condition may include or may be the authentication device leaving a pre-determined manufacturing premise and/or fulfilling a pre-determined manufacturing stage for the authentication device.

The second private key protection circuit 804 may protect the second private key.

The second private key protection circuit 804 may encrypt the second private key.

The second private key protection circuit 804 may determine the second private key.

The second public key and the second private key may be based on an identifier of the authentication device.

The second public key and the second private key may be based on a key seed. The key seed may include or may be a secret information.

The first public key and the first private key may be common to a plurality of authentication devices.

The second public key and the second private key may be specific to the authentication device.

The first public key may be a security public key. The first private key may be a security private key.

The second public key may be a custom public key. The second private key may be a custom private key.

Figure 9:
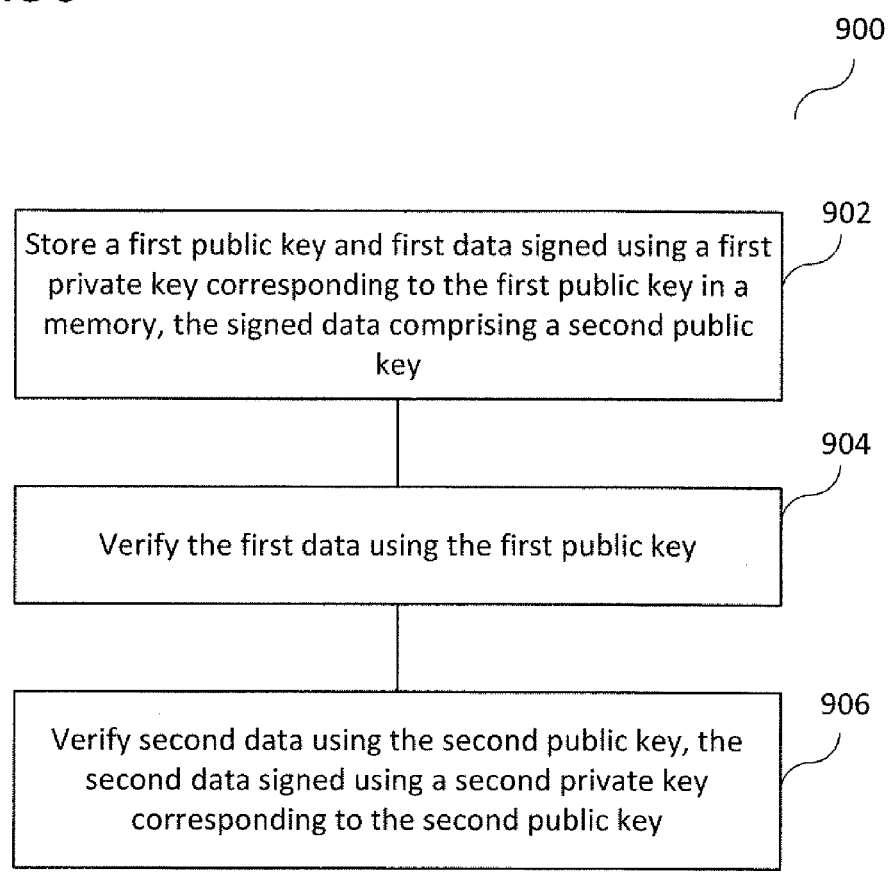
FIG. 9 shows a flow diagram illustrating a method for controlling an authentication device (for example the authentication device shown in FIG. 7 or the authentication device shown in FIG. 8)

FIG. 9 shows a flow diagram 900 illustrating a method for controlling an authentication device. In 902, a memory of the authentication device may store a first public key and first data signed using a first private key corresponding to the first public key in a memory. The signed (first) data may include or may be a second public key. In 904, a first verification circuit of the authentication device may verify the first data using the first public key. In 906, a second verification circuit of the authentication device may verify second data using the second public key. The second data may be signed using a second private key corresponding to the second public key.

The method may further include: storing the second data in the memory. The second data may include or may be configuration information for the authentication device.

The configuration information may include or may be data of at least one of the following types: language data, the language data including localization information for the authentication device; simlock data, the simlock data including information about a simlock of the authentication device; and calibration data for the authentication device.

The method may further include: storing the first public key in a protected portion of the memory.

The method may further include: storing the second private key.

The method may further include deleting the second private key from the memory.

The method may further include deleting the second private key from the memory based on a pre-determined condition.

The pre-determined condition may include or may be the authentication device leaving a pre-determined manufacturing premise and/or fulfilling a pre-determined manufacturing stage for the authentication device.

The method may further include protecting the second private key.

The method may further include encrypting the second private key.

The method may further include determining the second private key.

The second public key and the second private key may be based on an identifier of the authentication device.

The second public key and the second private key may be based on a key seed, the key seed including a secret information.

The first public key and the first private key may be common to a plurality of authentication devices.

The second public key and the second private key may be specific to the authentication device.

The first public key may be a security public key. The first private key may be a security private key.

The second public key may be custom public key. The second private key may be a custom private key.

A computer readable medium may include program instructions which when executed by a processor cause the processor to perform: storing a first public key and first data signed using a first private key corresponding to the first public key in a memory, the signed (first) data including a second public key; verifying the first data using the first public key; and verifying second data using the second public key, the second data signed using a second private key corresponding to the second public key.

The computer readable medium may further include program instructions which when executed by a processor cause the processor to perform: storing the second data in the memory. The second data may include or may be configuration information for the authentication device.

The configuration information may include or may be data of at least one of the following types: language data, the language data including or being localization information for the authentication device; simlock data, the simlock data including or being information about a simlock of the authentication device; and calibration data for the authentication device.

The computer readable medium may further include program instructions which when executed by a processor cause the processor to perform: storing the first public key in a protected portion of the memory.

The computer readable medium may further include program instructions which when executed by a processor cause the processor to perform: storing the second private key.

The computer readable medium may further include program instructions which when executed by a processor cause the processor to perform: deleting the second private key from the memory.

The computer readable medium may further include program instructions which when executed by a processor cause the processor to perform: deleting the second private key from the memory based on a pre-determined condition.

The pre-determined condition may include or may be the authentication device leaving a pre-determined manufacturing premise and/or fulfilling a pre-determined manufacturing stage for the authentication device.

The computer readable medium may further include program instructions which when executed by a processor cause the processor to perform: protecting the second private key.

The computer readable medium may further include program instructions which when executed by a processor cause the processor to perform: encrypting the second private key.

The computer readable medium may further include program instructions which when executed by a processor cause the processor to perform: determining the second private key.

The second public key and the second private key may be based on an identifier of the authentication device.

The second public key and the second private key may be based on a key seed, the key seed including a secret information.

The first public key and the first private key may be common to a plurality of authentication devices.

The second public key and the second private key may be specific to the authentication device.

The first public key may be a security public key. The first private key may be a security private key.

The second public key may be a custom public key. The second private key may be a custom private key.

Figure 10:
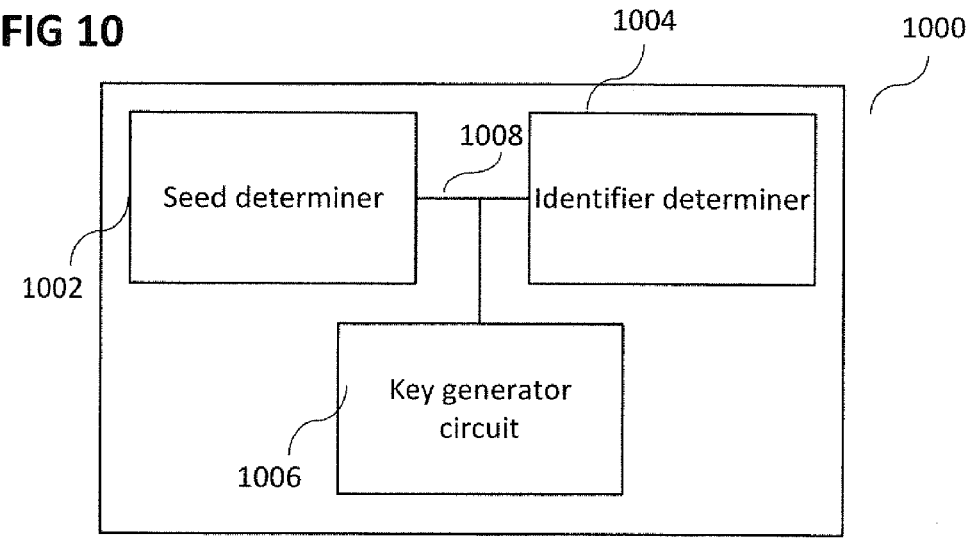
FIG. 10 shows a key generator device.

FIG. 10 shows a key generator device 1000. The key generator device 1000 may include a seed determiner 1002 configured to determine a key seed. The key seed may include or may be a secret information. The key generator device 1000 may further include an identifier determiner 1004 configured to determine an identifier of a protected device (for example of the authentication device 700 of FIG. 7 or the authentication device 800 of FIG. 8). The key generator device 1000 may further include a key generator circuit 1006 configured to generate a device specific key for the protected device based on the key seed and the identifier of the protected device. The seed determiner 1002, the identifier determiner 1004, and the key generator 1006 may be coupled with each other, for example via a connection 1008, for example an optical connection or an electrical connection, such as for example a cable or a computer bus or via any other suitable electrical connection to exchange electrical signals.

The device specific key may include or may be at least one of a device specific public key or a device specific private key.

Figure 11:
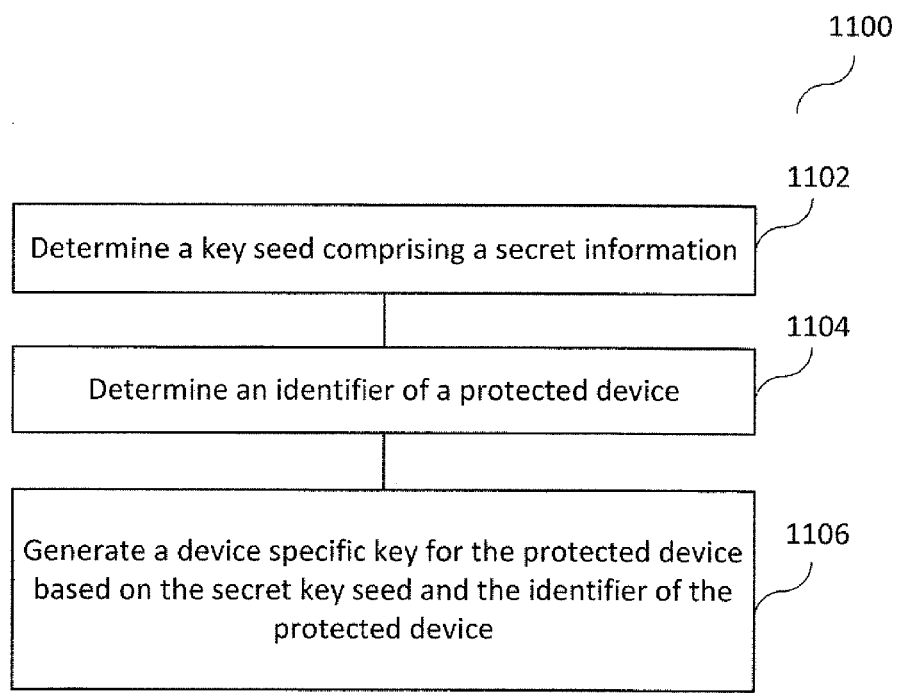
FIG. 11 shows a flow diagram illustrating a method for controlling a key generator device (for example the key generator device shown in FIG. 10).

FIG. 11 shows a flow diagram 1100 illustrating a method for controlling a key generator device. In 1102, a seed determiner of the key generator device may determine a key seed. The key seed may include a secret information. In 1104, a identifier determiner of the key generator device may determine an identifier of a protected device. In 1106, a key generator circuit of the key generator device may generate a device specific key for the protected device based on the key seed and the identifier of the protected device.

The device specific key may include or may be at least one of a device specific public key or a device specific private key.

A computer readable medium may include program instructions which when executed by a processor cause the processor to perform: determining a key seed including or being a secret information; determining an identifier of a protected device; and generating a device specific key for the protected device based on the key seed and the identifier of the protected device.

The device specific key may include or may be at least one of a device specific public key or a device specific private key.

An authentication system may include a key generator device. The a key generator device may include: a seed determiner configured to determine a key seed including or being a secret information; an identifier determiner configured to determine an identifier of a protected device; and a key generator circuit configured to generate a device specific public key and a device specific private key for the protected device based on the key seed and the identifier of the protected device. The authentication system may further include an authentication device. The authentication device may include a memory. The memory may store: the first public key; and first data signed using the first private key corresponding to the first public key, the signed (first) data including a second public key. The authentication device may further include a first verification circuit configured to verify the first data using the first public key; and a second verification circuit configured to verify second data using the second public key, the second data signed using a second private key corresponding to the second public key. The second public key may be the device specific public key. The second private key may be the device specific private key.

Any one of the authentication devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handy-phone System), WIDEN (Wideband Integrated Digital Enhanced Network), iBurst, Unlicensed Mobile Access (UMA, also referred to as 3GPP Generic Access Network, or GAN standard).

The following examples pertain to further embodiments.

Example 1 is an authentication device comprising: a memory configured to store: a first public key; and first data signed using a first private key corresponding to the first public key, the signed data comprising a second public key; the authentication device further comprising: a first verification circuit configured to verify the first data using the first public key; and a second verification circuit configured to verify second data using the second public key, the second data signed using a second private key corresponding to the second public key.

In Example 2, the subject-matter of Example 1 can optionally include that the memory is further configured to store the second data; wherein the second data comprises configuration information for the authentication device.

In Example 3, the subject-matter of Example 2 can optionally include that the configuration information comprises data of at least one type selected from a list of types consisting of: language data, the language data comprising localization information for the authentication device; simlock data, the simlock data comprising information about a simlock of the authentication device; and calibration data for the authentication device.

In Example 4, the subject-matter of any one of Examples 1-3 can optionally include that the memory comprises a protected portion; and wherein the protected portion is configured to store the first public key.

In Example 5, the subject-matter of any one of Examples 1-4 can optionally include that the memory is further configured to store the second private key.

In Example 6, the subject-matter of Example 5 can optionally include a second private key deletion circuit configured to delete the second private key from the memory.

In Example 7, the subject-matter of Example 6 can optionally include that the second private key deletion circuit is configured to delete the second private key from the memory based on a pre-determined condition.

In Example 8, the subject-matter of Example 7 can optionally include that the pre-determined condition comprises at least one of the authentication device leaving a pre-determined manufacturing premise or fulfilling a pre-determined manufacturing stage for the authentication device.

In Example 9, the subject-matter of any one of Examples 5-8 can optionally include a second private key protection circuit configured to protect the second private key.

In Example 10, the subject-matter of Example 9 can optionally include that the second private key protection circuit is configured to encrypt the second private key.

In Example 11, the subject-matter of any one of Examples 9-10 can optionally include that the second private key protection circuit is configured to determine the second private key.

In Example 12, the subject-matter of any one of Examples 1-11 can optionally include that the second public key and the second private key are based on an identifier of the authentication device.

In Example 13, the subject-matter of any one of Examples 1-12 can optionally include that the second public key and the second private key are based on a key seed, the key seed comprising a secret information.

In Example 14, the subject-matter of any one of Examples 1-13 can optionally include that the first public key and the first private key are common to a plurality of authentication devices.

In Example 15, the subject-matter of any one of Examples 1-14 can optionally include that the second public key and the second private key are specific to the authentication device.

In Example 16, the subject-matter of any one of Examples 1-15 can optionally include that the first public key is a security public key; and wherein the first private key is a security private key.

In Example 17, the subject-matter of any one of Examples 1-16 can optionally include that the second public key is a custom public key; and wherein the second private key is a custom private key.

Example 18 is a method for controlling an authentication device, the method comprising: storing a first public key and first data signed using a first private key corresponding to the first public key in a memory, the signed data comprising a second public key; verifying the first data using the first public key; and verifying second data using the second public key, the second data signed using a second private key corresponding to the second public key.

In Example 19, the subject-matter of Example 18 can optionally include storing the second data in the memory; wherein the second data comprises configuration information for the authentication device.

In Example 20, the subject-matter of Example 19 can optionally include that the configuration information comprises data of at least one type selected from a list of types consisting of: language data, the language data comprising localization information for the authentication device; simlock data, the simlock data comprising information about a simlock of the authentication device; and calibration data for the authentication device.

In Example 21, the subject-matter of any one of Examples 18-20 can optionally include storing the first public key in a protected portion of the memory.

In Example 22, the subject-matter of any one of Examples 18-21 can optionally include storing the second private key.

In Example 23, the subject-matter of Example 22 can optionally include deleting the second private key from the memory.

In Example 24, the subject-matter of Example 23 can optionally include deleting the second private key from the memory based on a pre-determined condition.

In Example 25, the subject-matter of Example 24 can optionally include that the pre-determined condition comprises at least one of the authentication device leaving a pre-determined manufacturing premise or fulfilling a pre-determined manufacturing stage for the authentication device.

In Example 26, the subject-matter of any one of Examples 22-25 can optionally include protecting the second private key.

In Example 27, the subject-matter of Example 26 can optionally include encrypting the second private key.

In Example 28, the subject-matter of any one of Examples 26-27 can optionally include determining the second private key.

In Example 29, the subject-matter of any one of Examples 18-28 can optionally include that the second public key and the second private key are based on an identifier of the authentication device.

In Example 30, the subject-matter of any one of Examples 18-29 can optionally include that the second public key and the second private key are based on a key seed, the key seed comprising a secret information.

In Example 31, the subject-matter of any one of Examples 18-30 can optionally include that the first public key and the first private key are common to a plurality of authentication devices.

In Example 32, the subject-matter of any one of Examples 18-31 can optionally include that the second public key and the second private key are specific to the authentication device.

In Example 33, the subject-matter of any one of Examples 18-32 can optionally include that the first public key is a security public key; and wherein the first private key is a security private key.

In Example 34, the subject-matter of any one of Examples 18-33 can optionally include that the second public key is custom public key; and wherein the second private key is a custom private key.

Example 35 is a computer readable medium including program instructions which when executed by a processor cause the processor to perform: storing a first public key and first data signed using a first private key corresponding to the first public key in a memory, the first signed data comprising a second public key; verifying the first data using the first public key; and verifying second data using the second public key, the second data signed using a second private key corresponding to the second public key.

In Example 36, the subject-matter of Example 35 can optionally include program instructions which when executed by a processor cause the processor to perform: storing the second data in the memory; wherein the second data comprises configuration information for the authentication device.

In Example 37, the subject-matter of Example 36 can optionally include that the configuration information comprises data of at least one type selected from a list of types consisting of: language data, the language data comprising localization information for the authentication device; simlock data, the simlock data comprising information about a simlock of the authentication device; and calibration data for the authentication device.

In Example 38, the subject-matter of any one of Examples 35-37 can optionally include program instructions which when executed by a processor cause the processor to perform: storing the first public key in a protected portion of the memory.

In Example 39, the subject-matter of any one of Examples 35-38 can optionally include program instructions which when executed by a processor cause the processor to perform: storing the second private key.

In Example 40, the subject-matter of Example 39 can optionally include program instructions which when executed by a processor cause the processor to perform: deleting the second private key from the memory.

In Example 41, the subject-matter of Example 40 can optionally include program instructions which when executed by a processor cause the processor to perform: deleting the second private key from the memory based on a pre-determined condition.

In Example 42, the subject-matter of Example 41 can optionally include that the pre-determined condition comprises at least one of the authentication device leaving a pre-determined manufacturing premise or fulfilling a pre-determined manufacturing stage for the authentication device.

In Example 43, the subject-matter of any one of Examples 39-42 can optionally include program instructions which when executed by a processor cause the processor to perform: protecting the second private key.

In Example 44, the subject-matter of Example 43 can optionally include program instructions which when executed by a processor cause the processor to perform: encrypting the second private key.

In Example 45, the subject-matter of any one of Examples 43-44 can optionally include program instructions which when executed by a processor cause the processor to perform: determining the second private key.

In Example 46, the subject-matter of any one of Examples 35-45 can optionally include that the second public key and the second private key based on an identifier of the authentication device.

In Example 47, the subject-matter of any one of Examples 35-46 can optionally include that the second public key and the second private key are based on a key seed, the key seed comprising a secret information.

In Example 48, the subject-matter of any one of Examples 35-47 can optionally include that the first public key and the first private key are common to a plurality of authentication devices.

In Example 49, the subject-matter of any one of Examples 35-48 can optionally include that the second public key and the second private key are specific to the authentication device.

In Example 50, the subject-matter of any one of Examples 35-49 can optionally include that the first public key is a security public key; and wherein the first private key is a security private key.

In Example 51, the subject-matter of any one of Examples 35-50 can optionally include that the second public key is custom public key; and wherein the second private key is a custom private key.

Example 52 is a key generator device comprising: a seed determiner configured to determine a key seed comprising a secret information; an identifier determiner configured to determine an identifier of a protected device; and a key generator circuit configured to generate a device specific key for the protected device based on the key seed and the identifier of the protected device.

In Example 53, the subject-matter of Example 52 can optionally include that the device specific key comprises at least one of a device specific public key or a device specific private key.

Example 54 is a method for controlling a key generator device, the method comprising: determining a key seed comprising a secret information; determining an identifier of a protected device; and generating a device specific key for the protected device based on the key seed and the identifier of the protected device.

In Example 55, the subject-matter of Example 54 can optionally include that the device specific key comprises at least one of a device specific public key or a device specific private key.

Example 56 is a computer readable medium including program instructions which when executed by a processor cause the processor to perform: determining a key seed comprising a secret information; determining an identifier of a protected device; and generating a device specific key for the protected device based on the key seed and the identifier of the protected device.

In Example 57, the subject-matter of Example 56 can optionally include that the device specific key comprises at least one of a device specific public key or a device specific private key.

Example 58 is an authentication system, comprising: a key generator device comprising: a seed determiner configured to determine a key seed comprising a secret information; an identifier determiner configured to determine an identifier of a protected device; and a key generator circuit configured to generate a device specific public key and a device specific private key for the protected device based on the key seed and the identifier of the protected device. The authentication system further comprises an authentication device comprising: a memory configured to store: the first public key; and first data signed using the first private key corresponding to the first public key, the signed data comprising a second public key. The authentication device further comprises a first verification circuit configured to verify the first data using the first public key; and a second verification circuit configured to verify second data using the second public key, the second data signed using a second private key corresponding to the second public key; wherein the second public key comprises the device specific public key; and wherein the second private key comprises the device specific private key.

In Example 59, the subject-matter of Example 58 can optionally include that the memory of the authentication device is further configured to store the second data; wherein the second data comprises configuration information for the authentication device.

Example 60 is an authentication device comprising: a memory means for storing: a first public key; and first data signed using a first private key corresponding to the first public key, the signed data comprising a second public key. The authentication device further comprises: a first verification means for verifying the first data using the first public key; and a second verification means for verifying second data using the second public key, the second data signed using a second private key corresponding to the second public key.

In Example 61, the subject-matter of Example 60 can optionally include that the memory means is further for storing the second data; wherein the second data comprises configuration information for the authentication device.

Example 62 is a key generator device comprising: a seed determining means for determining a key seed comprising a secret information; an identifier determining means for determining an identifier of a protected device; and a key generator means for generating a device specific key for the protected device based on the key seed and the identifier of the protected device.

In Example 63, the subject-matter of Example 62 can optionally include that the device specific key comprises at least one of a device specific public key or a device specific private key.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An authentication device comprising:
   a memory configured to store:
      a first public key; and
      a first data signed using a first private key corresponding to the first public key,
      the first data comprising a second public key;
      wherein the second public key and a corresponding second private key are generated from an identifier of the authentication device provided by the authentication device and a key seed configured for use for a plurality of devices,
   wherein the key seed is not stored on the authentication device;
   a first verification circuit configured to verify the first data using the first public key;
   a second private key deletion circuit configured to delete the second private key from the memory of the authentication device upon a condition that the second private key is stored in the authentication device; and
   a second verification circuit configured to verify a second data using the second public key, the second data signed using a duplicate of the second private key;
   wherein the duplicate of the second private key is generated by a key seed generator using the key seed and the identifier of the authentication device provided by the authentication device, wherein the key seed is external to the authentication device when the duplicate of the second private key is generated, and wherein the key seed generator is external to the authentication device.

2. The authentication device of claim 1,
   the memory further configured to store the second data;
   wherein the second data comprises configuration information for the authentication device.

3. The authentication device of claim 2,
   wherein the configuration information comprises data of at least one type selected from a list of types consisting of:
   language data, the language data comprising localization information for the authentication device;
   simlock data, the simlock data comprising information about a simlock of the authentication device; and
   calibration data for the authentication device.

4. The authentication device of claim 1,
   wherein the memory comprises a protected portion; and
   wherein the protected portion is configured to store the first public key.

5. The authentication device of claim 1,
   the second private key deletion circuit configured to delete the second private key
   from the memory based on a pre-determined condition.

6. The authentication device of claim 5,
   wherein the pre-determined condition comprises at least one of the authentication device leaving a pre-determined manufacturing premise or fulfilling a pre-determined manufacturing stage for the authentication device.

7. The authentication device of claim 1,
   the key seed comprising a secret information.

8. A method for controlling an authentication device, the method comprising:
   storing a first public key and a first data signed using a first private key corresponding to the first public key in a memory, the first data comprising a second public key;
   verifying the first data using the first public key;
   wherein the second public key and a second private key corresponding to the second public key are generated from:
      a key seed configured for use for a plurality of devices, wherein the key seed is not stored on the authentication device; and
      an identifier of the authentication device provided by the authentication device;
   discarding the second private key without storing it in the memory;
   generating a duplicate of the second private key with a key seed generator using the identifier of the authentication device and the key seed, wherein the key seed and the key seed generator are external to the authentication device when the duplicate of the second private key is generated; and
   verifying a second data using the second public key, the second data signed using the duplicate of the second private key.

9. The method of claim 8, further comprising:
   storing the second data in the memory;
   wherein the second data comprises configuration information for the authentication device.

10. The method of claim 9,
    wherein the configuration information comprises data of at least one type selected from a list of types consisting of:
    language data, the language data comprising localization information for the authentication device;
    simlock data, the simlock data comprising information about a simlock of the authentication device; and
    calibration data for the authentication device.

11. The method of claim 8, the method further comprising:
    storing the first public key in a protected portion of the memory.

12. The method of claim 8, further comprising:
    deleting the second private key from the memory based on a pre-determined condition.

13. The method of claim 12,
    wherein the pre-determined condition comprises at least one of the authentication device leaving a pre-determined manufacturing premise or fulfilling a pre-determined manufacturing stage for the authentication device.

14. The method of claim 8,
    the key seed comprising a secret information.

15. A process by which to manufacture an authentication device, comprising:
    storing a first public key and a first data signed using a first private key corresponding to the first public key in a memory of the authentication device, the first data comprising a second public key, wherein the second public key and a second private key corresponding to the second public key are generated by a key generator which uses an identifier of the authentication device and a key seed configured for use for a plurality of devices as inputs for key generation, wherein the key seed is not stored on the authentication device and is provided to a first level manufacturer by a second level manufacturer, wherein the key generator is external to the authentication device;

verifying the first data using the first public key;

discarding the second private key without storing the second private key in the memory;

generating a duplicate of the second private key using a second key generator at a second level of manufacture, wherein the second key generator uses the identifier of the authentication device and the key seed as inputs for key generation, wherein the second key generator is external to the authentication device;

signing a second data using the duplicate of the second private key;

storing the second data in the memory; and verifying the second data in the authentication device using the second public key.

16. The process of claim 15, wherein the second data comprises configuration information for the authentication device.

\* \* \* \* \*